United States Patent [19]

Newsom, Jr.

[11] 4,383,846
[45] May 17, 1983

[54] STABILIZATION OF LIQUID FERTILIZER COMPOSITIONS

[75] Inventor: William S. Newsom, Jr., Lake City, Fla.

[73] Assignee: Occidental Research Corporation, Irvine, Calif.

[21] Appl. No.: 127,293

[22] Filed: Mar. 5, 1980

[51] Int. Cl.³ ............................ C05B 1/06; C05B 7/00
[52] U.S. Cl. ................................. 71/33; 71/34; 71/43; 71/64.10; 252/DIG. 7; 252/355
[58] Field of Search ................. 71/33, 34, 43, 64.10; 252/DIG. 7, 351, 352, 355; 423/310–313

[56] References Cited

U.S. PATENT DOCUMENTS 2,820,043  1/1958  Rainey et al. ............... 252/DIG. 7
4,033,747  7/1977  Young ............................ 71/30
4,231,903  11/1980  Lindemann et al. ......... 252/DIG. 7

FOREIGN PATENT DOCUMENTS 7027541  7/1970  France ........................... 71/64 C Primary Examiner—Ferris H. Lander
Attorney, Agent, or Firm—Barry A. Bisson

[57] ABSTRACT

A process for inhibiting the growth of insoluble magnesium-containing solids in liquid fertilizer compositions, prepared from the ammoniation of wet process phosphoric acids, comprises the addition of surfactant compounds to the fertilizer.

12 Claims, No Drawings

4,383,846

STABILIZATION OF LIQUID FERTILIZER COMPOSITIONS

BACKGROUND OF THE INVENTION

This invention relates to a process for inhibiting the growth of insoluble solids in liquid fertilizer compositions which are prepared from wet process phosphoric acid, particularly those ammonium phosphate and ammonium polyphosphate fertilizers which are produced by the neutralization, with ammonia, of phosphoric acid.

The most widely used method in the fertilizer industry for producing phosphoric acid is commonly referred to as the "wet process", involving the reaction of phosphate rock with sulfuric acid. After filtering to remove calcium sulfate, the reaction mixtuure comprises a rather impure phosphoric acid, containing a variety of impurities, and usually having a concentration, on a weight basis, in the range of about 30% $P_2O_5$ to about 40% $P_2O_5$, depending upon the process parameters which are chosen. This acid is normally concentrated prior to shipment, yielding a product which contains about 54% by weight $P_2O_5$ (and called merchant grade acid) to about 68–76% by weight $P_2O_5$ (and called superphosphoric acid). Unfortunately, the concentration step has the effect of increasing the level of impurities present.

Specific impurities which are present in the phosphoric acids are principally dependent upon the composition of the phosphate rock which was used in the wet process. Calcium, sulfur, iron, aluminum, magnesium and fluorine and other elements are usually present as impurities in varying proportions. Also present are various organic compounds, both derived from organic materials which were contained within the phosphate rock, and from the organic reagents used in the wet process for defoaming, crystal growth and the like. Some of the organic impurities are typically found as insoluble particulate solids, while others are soluble in the phosphoric acid. The organic impurities often cause the more concentrated acids to be very dark in color, frequently even black.

Liquid mixed fertilizers have become very popular in the industry, both from the standpoint of the producer and that of the consumer. The major advantages over standard dry mixed fertilizers include elimination of the expensive steps for evaporating water and packaging, as well as the greatly simplified soil application procedures with liquids. In addition, the liquids are easier to handle and transport, since no segregation or caking problems are encountered.

However, serious problems have been experienced in the handling and storage of liquid fertilizers obtained from the ammoniation of phosphoric acids which contain all of their phosphorus values as the acyclic orthophosphate species, since voluminous precipitates of the metallic impurities in the acid are also formed by ammoniation. These precipitates are very difficult to remove by filtration and render the fertilizer composition unsuitable for soil application by means of the usual spray nozzles.

In response to this problem, several workers discovered that by properly concentrating the wet process phosphoric acid to a $P_2O_5$ analysis of 60–76%, there are formed acyclic polymers of phosphoric acid, including pyro-, tripoly-, and higher polyphosphoric acids. The presence of a substantial amount of these polymers was found to sequester the iron and aluminum present in the phosphoric acid, and thereby avoid the formation of the voluminous precipitates which otherwise form upon ammoniation. Examples of this are found in U.S. Pat. No. 3,192,013 to Young and U.S. Pat. No. 3,317,306 to Getsinger, both incorporated herein by reference.

A problem relating to the long-term storage of ammoniated phosphoric acids still exists, in spite of the discovery noted above, particularly for fertilizer compositions which were prepared from acids containing high amounts of magnesium (greater than about 0.5% by weight MgO). This results from the insolubility of complex magnesium-containing compounds, such as $Mg(NH_4)_2P_2O_7 \cdot 4H_2O$ and $MgAl(NH_4)_5(P_2O_7)_2F_2 \cdot 6H_2O$. Typically, the precipitation of magnesium compounds does not become a problem until several weeks or months after the ammoniation preparation of the fertilizer solution. The solids are a nuisance in that they form a scale which is difficult to remove from storage vessels and they can plug spray nozzles in field distribution equipment. They also represent a considerable loss of valuable phosphorus from the fertilizers.

Examples of processes for the removal of magnesium and other metallic impurities from phosphoric acid are those of Mills, as shown in U.S. Pat. No. 4,136,199 and U.S. patent application Ser. No. 954,647, filed Oct. 25, 1978, both of which are incorporated herein by reference. These involve a precipitation of a complex salt-containing fluoride, magnesium and other metals such as sodium and aluminum, initiated by the addition of a substance containing calcium fluoride to heated phosphoric acid, maintaining the elevated temperature for a sufficient period of time, and forming a removable precipitate, thereby lowering the soluble impurity content of the acid.

A precipitation of magnesium from phosphoric acid using fluosilicate has been described in U.S. Pat. No. 3,819,810.

Other workers, including Williams, et al. in U.S. Pat. No. 3,694,153, have used solvent extraction processes to remove metallic impurities such as calcium, magnesium, iron and aluminum, to give a more easily stored fertilizer solution upon ammoniation.

British Pat. No. 1,139,192 shows the use of substituted phosphonic acids, of which amino-tris (methylene phosphonic) acid is exemplary, for inhibiting the growth of precipitates in ammoniated phosphoric acids, particularly when potash and trace metallic elements are also added.

Methods are known for decolorizing wet process phosphoric acids, primarily by removal of the carbonaceous matter, including those of U.S. Pat. Nos. 3,619,161 to Knarr et al (addition of water-insoluble organic agents, removing carbon in the organic layer), 3,630,711 to Burkert (flocculation of carbonaceous material with an aliphatic organic amine, removal as a froth), and 3,969,483 to Stinson et al. (flocculation with aliphatic amines and quaternary ammonium chloride, flotation of carbon), plus the U.S. Defensive Publication Nos. T866,034 of Burch (use of phosphate rock as a settling aid for carbonaceous material) and T942,007 of Stinson et al. (flocculation with primary amines and quaternary ammonium chlorides).

The methods, described above, which involve a precipitation or similar separation step usually suffer from the disadvantage of requiring a considerable period of time, ordinarily without agitation, for the desired phase separation to occur. As a result, it is necessary to provide a plurality of very large, often heated, storage vessels in which the separation may be effected. Similarly, extraction purification processes have the inherent disadvantage of requiring costly equipment and reagents.

DESCRIPTION OF THE INVENTION

In accordance with the invention, it has been discovered that the storage life of liquid fertilizers, produced by the ammoniation of phosphoric acids, can be markedly extended by the addition of surfactant compounds which retard the formation of magnesium-containing precipitates. As an additional benefit, the carbonaceous particles present in the fertilizer are flocculated and float to the liquid surface, leaving a clarified liquid below, after treatment with some of the surfactant compounds.

Fertilizer solutions which can be treated according to this invention include those which are derived from wet process phosphoric acid. Although the process of the invention would probably be operable with solutions not containing wet process acid, such other materials normally do not present the problem of excessive impurity content which creates the need for this invention. Wet process phosphoric acid, as the term is used herein, includes acid of any strength which is prepared by the acidulation of phosphate rock including the "filter-grade" acid of about 28% to about 42% by weight $P_2O_5$, the "merchant-grade" acid containing from about 48% to about 54% by weight $P_2O_5$, the "superphosphoric acid" containing from about 68% to about 76% by weight $P_2O_5$, and other strengths of phosphoric acid which can be used to prepare liquid fertilizers.

Examples of fertilizer solutions which can be treated are those prepared by the ammoniation of wet process phosphoric acid, fertilizer base solutions such as 10-34-0 (a composition containing about 10% nitrogen and about 34% $P_2O_5$ by weight) or 11-37-0 (about 11% nitrogen and about 37% $P_2O_5$ by weight), mixed solutions which also contain a potassium salt, mixed solutions also containing urea, ammonium nitrate or a blend thereof, and the like. Preferred fertilizer solutions for the practice of this invention are those prepared by the ammoniation of superphosphoric acid.

The reagents used for fertilizer stabilization according to the present invention can be broadly classified as surfactants. Types of surfactants which are useful in the practice of the invention include cationic, anionic, nonionic and amphoteric surfactants. Especially preferred are those surfactants classified as "amphoteric". Some representative groups of useful amphoteric stabilizers are the following:

Imidazoline monocarboxylate 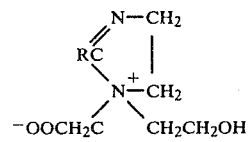

Imidazoline dicarboxylate 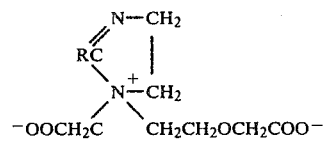

Imidazoline derivatives 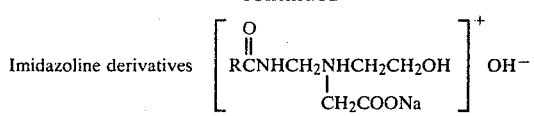

Betaines 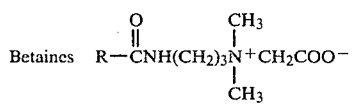

In the above formulas, R can be an acyclic group, saturated or unsaturated, straight-chain or branched, substituted or unsubstituted, containing from 1 to about 20 carbon atoms. The formulae are examples of the types of compounds which can be used, but other compounds, including several proprietary amphoteric surfactant compositions which are commercially available, are also useful in the practice of the invention.

Other reagents which can be used for fertilizer stabilization include N-substituted sulfamic acids having the structure

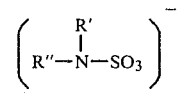

wherein R" is an alkyl, alkenyl or aryl group, substituted or unsubstituted, containing up to about 20 carbon atoms, and R' is a hydrogen, alkyl, alkenyl or aryl group containing up to about 20 carbon atoms; N-substituted amino acids which are analogous to these sulfamic acids; and the like.

The conditions for mixing the surfactant with the fertilizer solution are not especially critical. It is only necessary to thoroughly disperse the surfactant throughout the fertilizer solution. Surfactant can be added to a stirred vessel of fertilizer solution, or can be introduced to a turbulent flow of fertilizer solution within a conduit, or can be admixed using other means known to the art. Also, surfactant additions need not be made at the time of base solution preparation (i.e., when the wet process phosphoric acid is reacted with ammonia), but can be accomplished after addition of other plant nutrients to form the final fertilizer product.

One precaution should be taken, however, if the surfactant is added concurrently with the dissolution of hot, molten ammoniated superphosphoric acid, prepared as described in Example 1 or by a similar process. Due to the fact that some of the useful surfactants decompose at temperatures which can be obtained during the ammoniation process, the mixing of surfactant into the fertilizer solution should be conducted at a temperature low enough to prevent decomposition. To accomplish this, a cooling step could be needed in a particular process between the dissolution step and the addition of surfactant.

Ordinarily, an effective amount of surfactant added for stabilizing the liquid fertilizer against the growth of insoluble solids is less than about 5% by weight. It is preferred, however, to use the smallest amount which gives the desired result, to minimize the cost of treatment. The preferred amount is usually less than about 1.5% surfactant by weight.

After the surfactant has been added to the fertilizer solution, carbonaceous matter tends to separate from the solution and, upon standing, will float to the liquid surface. The amount of solid magnesium compounds present is quickly reduced, and their re-precipitation is retarded for a considerable period of time. The clear liquid can be drawn off from the bottom of a vessel after prolonged storage for application to soil or for further processing, while the carbonaceous layer can be used, e.g., to prepare suspension or solid fertilizer.

The invention is further illustrated by reference to the following example, in which all percentages are expressed on a weight basis.

EXAMPLE

A wet process phosphoric acid analyzing 48.35% $P_2O_5$ and 0.37% MgO was treated with magnesium oxide, with stirring, to obtain a MgO content of about 0.69%. After all of the magnesium oxide had dissolved, the acid was evaporated to superphosphoric acid by a submerged combustion technique as in "Phosphoric Acid", Vol. 1, Part II, Marcel Dekker, Inc., New York, (1968), edited by A. V. Slack, pp. 588–606. This acid had the following analysis:

| Component | Weight % |
|---|---|
| Total $P_2O_5$ | 70.20 |
| Ortho $P_2O_5$ | 44.57 |
| MgO | 0.99 |
| F | 0.29 |
| $SO_4$ | 2.08 |
| $Fe_2O_3$ | 1.88 |
| $Al_2O_3$ | 1.89 |

The superphosphoric acid was ammoniated in a pipe reactor, using anhydrous ammonia, and the resulting melt was discharged into an agitated vessel of water, to which additional ammonia was added. Water was circulated through a cooling coil in the vessel to maintain a temperature of about 105° F. to about 110° F. in the reacting mixture. After the mixture reached a specific gravity of about 1.43 and a pH of about 5.8, ammoniation was discontinued and a preliminary chemical analysis was made on a sample of the vessel contents. Additional water and aqueous ammonia were then added to prepare a 10-34-0 base solution. The analysis of the solution was as follows:

| Component | Weight % |
|---|---|
| N | 10.05 |
| Total $P_2O_5$ | 34.29 |
| Ortho $P_2O_5$ | 5.99 |
| $SO_4$ | 1.03 |
| F | 0.12 |
| MgO | 0.50 |
| $Fe_2O_3$ | 0.92 |
| $Al_2O_3$ | 1.03 |
| $H_2O$ Insolubles | 0.29 |

Portions of the base solution were mixed with various surfactant compounds and duplicate portions of the mixture were then placed in 100 ml Goetz type graduated centrifuge tubes, which were closed with rubber stoppers.

At weekly intervals, the tubes were centrifuged, inverted, and the volume of solids noted. While this procedure does not provide a measure of total insolubles, it is thought to indicate the content of solids which causes deposit buildup in storage vessels.

Storage life of the mixtures was determined using an arbitrary scale, as follows:
 Solids less than 1% by volume—very good
 Solids 1% to 3% by volume—satisfactory
 Solids more than 3% by volume—unsatisfactory The reported storage life, therefore, is the length of time during which the insoluble solids content is less than 3% by volume.

The following table shows the observed storage life for a control sample (no additives to the base solution) and fourteen amphoteric stabilizers, listed by trade name:

| Stabilizer | % Added | Storage Life, Weeks |
|---|---|---|
| None (control) | — | 15 |
| Antaron MC 44 | 0.35 | 15 |
| Antaron MC 44 | 0.69 | 21 |
| Cycloteric BET-C30 | 0.39 | 8 |
| Cycloteric BET-C30 | 0.78 | 8 |
| Cycloteric MV-SF | 0.32 | 3 |
| Cycloteric MV-SF | 0.64 | 26 |
| Monateric CA-35 | 0.39 | 6 |
| Monateric CA-35 | 0.78 | 5 |
| Monateric CY-NA50 | 0.20 | 5 |
| Monateric CY-NA50 | 0.39 | 27 |
| Monateric CEM-38 | 0.35 | 6 |
| Monateric CEM-38 | 0.70 | 26 |
| Monateric ISA-35 | 0.29 | 6 |
| Monateric ISA-35 | 0.57 | 12 |
| Monateric LF 100 | 0.10 | 5 |
| Monateric LF 100 | 0.21 | 27 |
| Monateric ADA | 0.40 | 10 |
| Monateric ADA | 0.80 | 8 |
| Monateric 811 | 0.21 | 26 |
| Monateric 811 | 0.41 | 24 |
| Rewopon AM-2L | 0.28 | 14 |
| Rewopon AM-2L | 0.55 | 12 |
| Rewopon AMB-13 | 0.26 | 24 |
| Rewopon AMB-13 | 0.52 | 6 |
| Solar CI 387 | 0.20 | 24 |
| Solar CI 387 | 0.39 | 24 |
| Soromine AT | 0.67 | 13 |
| Soromine AT | 1.34 | 21 |

As can be seen in the table, the storage life of the solution was markedly extended by the addition of an appropriate amount of certain surfactant compounds.

Antaron MC 44 is reported to be a dicarboxylic imidazoline derivative, in which R is a cocoyl group.

Cycloteric BET-C 30 is a betaine in which R is oleyl. Cycloteric MV-SF is a monocarboxylic imidazoline derivative, having R as a capryl group.

A less thorough description of the remaining compounds is provided by the trade literature. The following information is believed to apply to these compounds:

| Compound | Description |
|---|---|
| Monateric CA-35 | Monocarboxylic Imidazoline, R is coco |
| Monateric CY-NA50 | Monocarboxylic Imidazoline, R is $C_8$ |
| Monateric ADA | Betaine Derivative: alkyl amido propyl dimethyl betaine. Alkyl derived from coconut fatty acid. |
| Monateric 811 | Dicarboxylic Imidazoline, R is $C_8$ |
| Rewopon AM-2L | Contains a lauryl group |
| Rewopon AMB-13 | Coco amido propyl betaine |
| Solar CI 387 | N—2-hydroxyethyl-2-heptadecenyl imidazoline hydrochloride |
| Soromine AT | Complex fatty amido compound |

Following are the sources for amphoteric surfactants which were used in the experiment: Antaron and Soromine compounds were obtained from GAF, New York, N.Y.; Cycloteric compounds from Cyclo Chemicals Corp., Miami, Fla.; Monateric compounds from Mona Industries, Inc., Paterson, N.J.; Rewopon compounds from Rewo Chemicals, Inc., Bohemia, Long Island, N.Y.; and Solar compounds from Estech, Chicago, Ill.

This experiment is typical of that which would be used by an artisan to evaluate surfactant additives for inhibiting solids growth in fertilizer solutions, both for determining effective types and for the amounts of additive required.

What is claimed is:

1. A process for retarding the growth of solids in a liquid fertilizer composition derived from wet process phosphoric acid, comprising the step of adding an amphoteric surfactant which can retard said growth of solids to the liquid fertilizer composition in an amount effective to retard said growth of solids and in which the amphoteric surfactant comprises a compound selected from the group consisting of imidazoline monocarboxylates, imidazoline dicarboxylates and betaines.

2. A process as in claim 1 in which up to about 5% by weight of said amphoteric surfactant is added to the liquid fertilizer composition to retard the growth of solids therein.

3. The process of claim 1 in which said amphoteric surfactant comprises a coco amido propyl betaine.

4. The process of claim 1 wherein said amphoteric surfactant comprises a member selected from monocarboxylic imidazolines containing a substituent of 8 carbon atoms and dicarboxylic imidazolines.

5. The process of claim 1 wherein said amphoteric surfactant comprises an N-2-hydroxyethyl-2-heptadecenyl imidazoline hydrochloride.

6. A liquid fertilizer composition containing ammonium phosphates comprising ammonium orthophosphates and ammonium polyphosphates and an amphoteric surfactant which can retard the growth of solids in said liquid fertilizer, said amphoteric surfactant being present in said composition in an amount effective to retard the growth of solids in said liquid fertilizer and wherein said amphoteric surfactant comprises a compound selected from the group consisting of imidazoline monocarboxylates, imidazoline dicarboxylates and betaines.

7. The fertilizer of claim 6 wherein said fertilizer was manufactured from phosphoric acid produced by the wet process.

8. The fertilizer of claim 6 wherein said fertilizer was manufactured by ammoniation of wet process phosphoric acid.

9. The fertilizer of claim 6 in which said amphoteric surfactant comprises a coco amido propyl betaine.

10. The fertilizer of claim 6 wherein said amphoteric surfactant comprises a member selected from monocarboxylic imidazolines containing a substituent of 8 carbon atoms and dicarboxylic imidazolines.

11. The fertilizer of claim 6 wherein said amphoteric surfactant comprises an N-2-hydroxyethyl-2-heptadecenyl imidazoline hydrochloride.

12. A process for retarding the growth of solids in a liquid fertilizer composition prepared from ammoniated wet process superphosphoric acid comprising the step of adding amphoteric surfactant to the liquid fertilizer in an amount effective to retard growth of solids within said liquid fertilizer, said amount being up to about 1.5% by weight.

* * * * *